Sept. 23, 1958 — O. C. MEYER — 2,852,996
LAWN CONDITIONING FORK
Filed Oct. 12, 1953 — 2 Sheets-Sheet 1
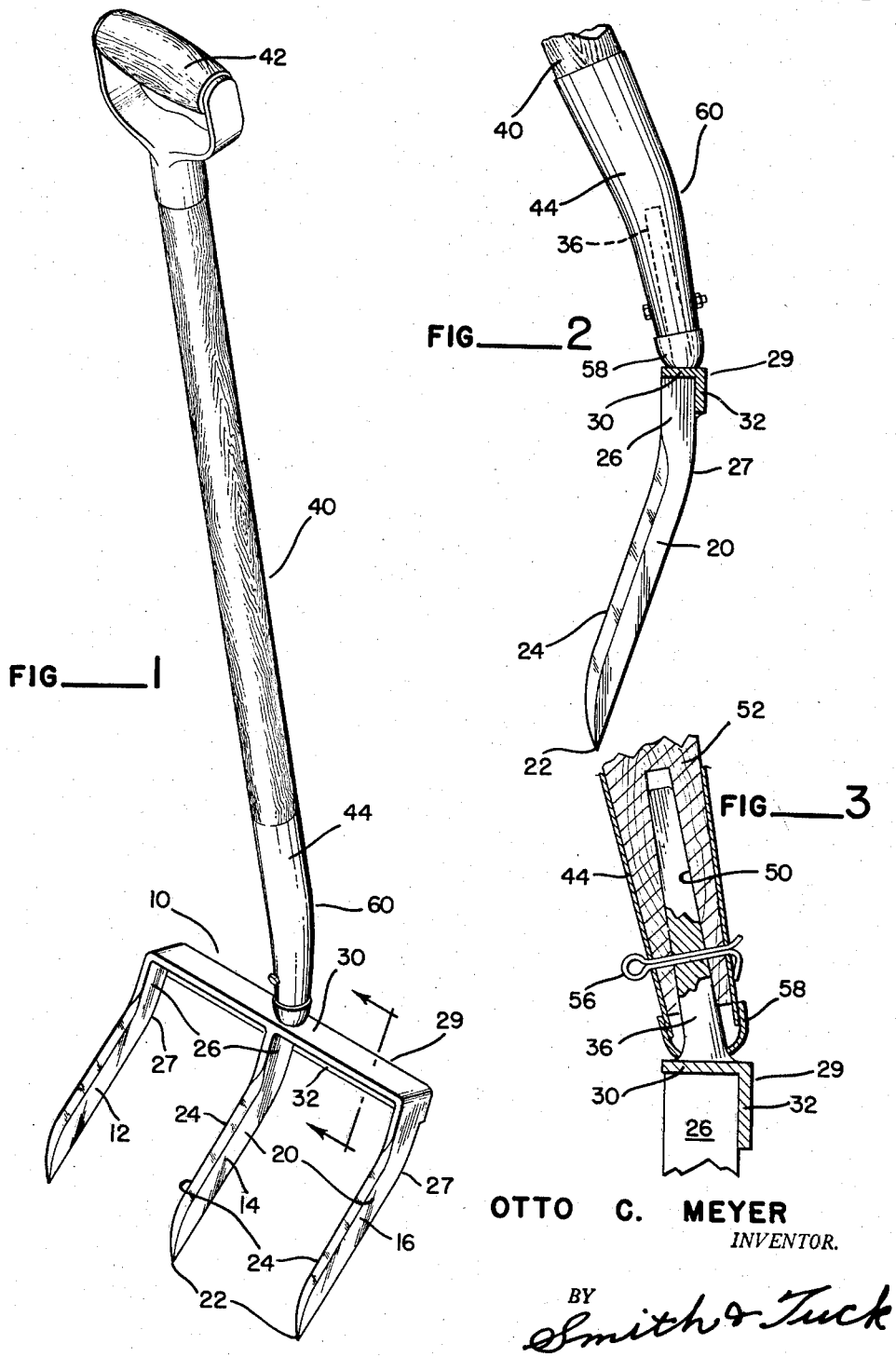
OTTO C. MEYER
*INVENTOR.*
BY Smith & Tuck

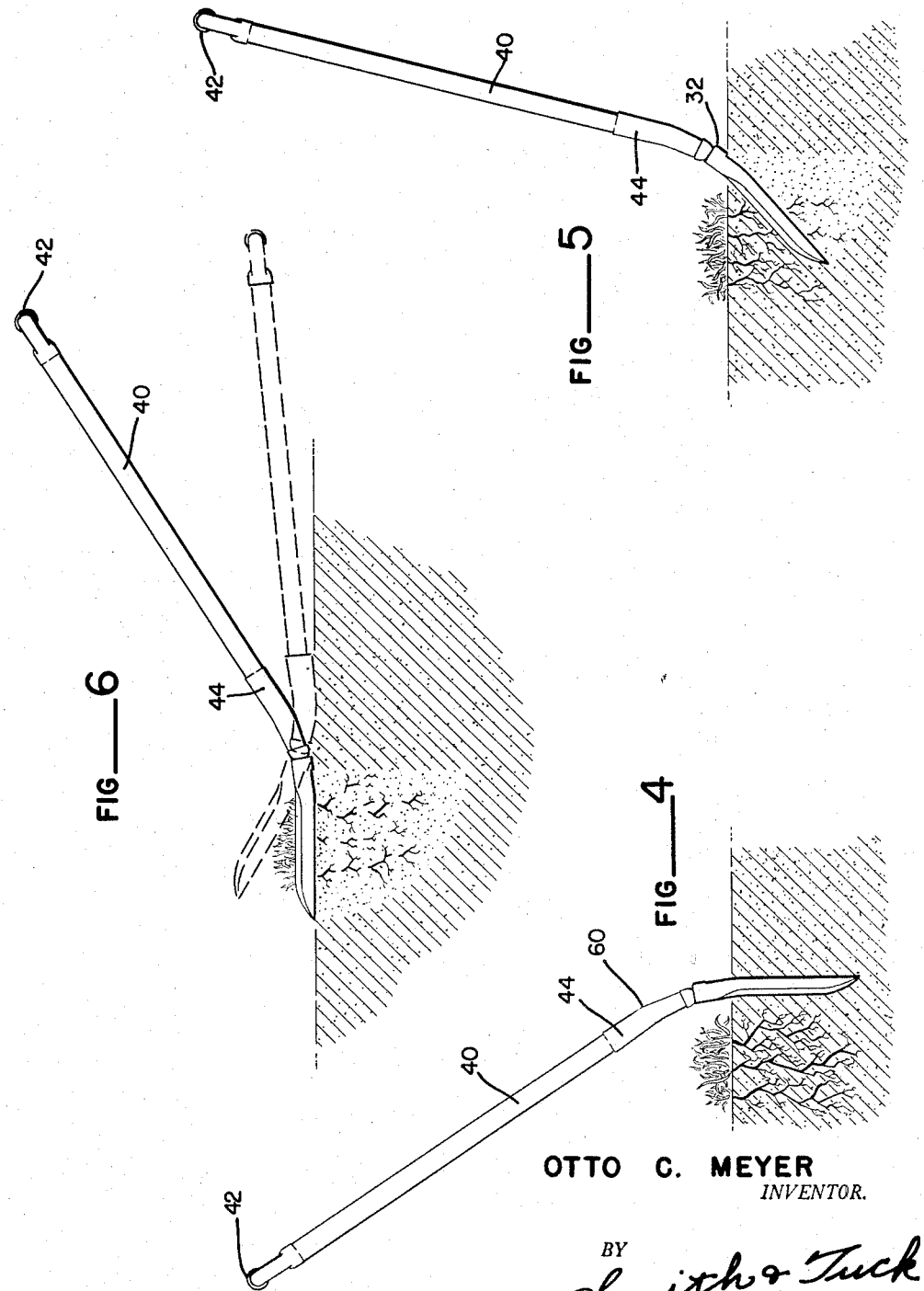

United States Patent Office 2,852,996
Patented Sept. 23, 1958

2,852,996

LAWN CONDITIONING FORK

Otto C. Meyer, El Paso, Tex.

Application October 12, 1953, Serial No. 385,372

4 Claims. (Cl. 97—61)

This present invention relates to the general art of lawn conditioning tools, and more particularly to a fork-like tool the cutters of which can be easily pressed into the ground, and then by tipping the same, the subsoil can be loosened with the minimum of applied effort. This tool consists essentially of a plurality of edge-sharpened tines, which might be likened to a plurality of heavy knives, secured to a common horizontal bar and which present their sharpened edges toward the direction in which the tines are moved when the user pries backwardly on the handle of the device. It is quite distinct from the garden, or spading fork in that due to the sharpened edges, there is no tendency to dig up the ground, or to appreciably move the soil, passage of the blade through the soil merely cutting through any matted root clusters or hard ground so as to permit the ready penetration of air and moisture into the soil.

The maintenance of lawns has long been a perplexing problem and many tools have been devised in an endeavor to overcome the compacting of lawn areas. After lawns have been well started, there is a gradual year by year packing of the soil, a further contributing factor is the balling up of grass roots which cannot penetrate through the packed soil. This is due in a large measure to the fact that while most cultivated areas are plowed or otherwise worked so as to thoroughly loosen up the ground and aerate the same, lawns, because it is desired to preserve the grass surface, gradually compact until it is impossible for air or moisture to enter. This general effect produces a condition where the lawn grasses become rootbound and there is a real need to cut or break up the root clusters so as to permit air and moisture to penetrate the soil. In large grass areas, as in parks and the like, bulky machines have been provided, usually consisting of a heavy roller to which is applied a number of ground-piercing points. While these machines as developed have to a degree solved the problem of the large grass areas, they are not commercially adaptable to the use of small lawns and of course are well beyond the financial reach of the usual homeowner. As a substitute, many devices have been produced having points that are adapted to be driven into the ground, or pressed in by the user's weight. These devices in turn serve to a limited degree the intended purpose of perforating the ground but they do not provide for the breaking up of the heavy root clusters.

In this present invention, a means is provided which can be easily pressed into the ground so as to provide a plurality of punctures well into the subsoil, then by swinging back on the tool handle, the sharpened knifelike tines then cut the root masses and further break up any firmly compacted area. The plurality of knives also permits a single insertion of the tool to aerate and loosen an appreciable area. Thus the homeowner is provided with a tool that is relatively cheap to manufacture and which can be used with the minimum exertion. It serves a dual function of aerating the ground and breaking up root masses and it is therefore believed to be a real contribution in the field of lawn-conditioning tools.

The principal object of this present invention therefore is to provide an easily-operated tool for puncturing and aerating the subsoil of a lawn so as to break up the heavily impacted areas and heavy root masses so that air and moisture can penetrate into the depth of the grass roots such as nature intended.

A further object of this invention is to provide a tool which consists of a plurality of sharpened blades which in turn can be easily pressed into the ground, and then, by a prying action, be caused to pass through the ground, all with the minimum of effort.

A further object of this invention is to provide a tool with which a relatively large area can be quickly covered in a manner insuring the penetration of air and water into the subsoil;

Further objects, advantages and capabilities will be apparent from the description and disclosure in the drawings, or may be comprehended or are inherent in the device.

In the drawings:

Figure 1 is a perspective view showing a tool made after the teachings of this present invention;

Figure 2 is a fragmentary view, partly in section, illustrating the construction of the knife assembly of this invention;

Figure 3 is a vertical, sectional view showing a practical manner in which the tine structure is secured to the handle proper; and Figures 4, 5, and 6 are vertical, sectional views showing sequentially the manner of using this garden-conditioning tool.

Referring more particularly to the disclosure in the drawings, the numeral 10 designates generally the cutting or tine structure of this garden tool. This structure appears generally similar to a fork but its construction and functioning is quite far removed from the ordinary fork, such as is used in gardening and the like and often referred to as a "garden fork" or "spading fork."

In this present device, a plurality of blades as 12, 14, and 16 is provided. Each of these blades is formed quite similarly to a heavy hunting knife in that there is the body portion as 20, a sharpened point 22, and from the point a sharpened edge as 24 extends up to what would be the handle portion at 26, in terms of the average knife. To make the operation of the tool more convenient, a curved portion occurs at 27. In this instance, however, the various handle portions 26 are joined together by a relatively heavy backing. In its preferred form, this backing takes the form of a heavy angle 29, having the normally horizontal portion 30 and the vertical portion 32. This arrangement provides a very secure mounting for blades 12, 14, and 16 and holds them in fixed parallel relationship with each other. The upper surface, or member 30, provides a relatively wide bar portion so that the foot can be used in contact with the same to press the tool down into the ground. Any tendeny for bar 30 to be bent or sprung in this operation is fully resisted by the vertically-disposed portion 32 of the angle.

Formed preferably integrally with angle 29, which in turn is formed by members 30 and 32, is the tang portion 36. This tang portion for all practical purposes must be a fixed unit with bar 29 because considerable force is applied to it when the operator employs his weight against it through the relatively long handle 40.

Handle 40 is constructed after the mode of heavy spading forks or shovel handles, having preferably a transversely-disposed hand grip at 42 and a metal ferrule at 44. It is desired to point out, however, that in coupling handle 40 to the tine structure 10 the bend of the handle is normally reversed from that of the usual fork, spade, or shovel. This arrangement is a very desirable one from the standpoint of utility in this tool, as will be noted from a study of Figures 4, 5, and 6.

A preferred form of joining handle 40 and tine structure 10 is illustrated in Figures 2 and 3 in which it will be noted that tang 36 is inserted into a socket 50 formed in the wood handle proper 52. To hold the handle securely to the tine structure and permit the substitution of a new handle conveniently, a hole has been drilled through the ferrule member 44, wood handle 52, and tang 36, and through this a bolt or pin, such as cotter pin 56, is then passed to provide a firm engagement. To strengthen ferrule 44, a closing cap 58 may be employed in order to protect the wood within the ferrule from entrance of moisture, dirt and the like, and this ferrule arrangement may, if desired, be firmly affixed, as by welding, to tang 36. An alternate structure would be to dispense with tang 36 and use a heavier ferrule or socket, formed as part of tine assembly 10, to receive the wood handle 40.

Method of use

In using this device, the general plan follows the showing of Figures 4, 5, and 6. Referring to Figure 4, the tool has been pressed into the ground with blades as 12, 14, and 16 in the vertical position. Because of a particular placement of bend 60 as illustrated, and further through use of the bend at 27, the hand grip portion of handle 40 is considerably forward of the user's position but still not in a manner to be unhandy in use. It will be noted that the sharpened edges 24 are directed toward the area it is desired to cut through. The next operation is illustrated in Figure 5 in which the operator has pulled backwardly on handle 40 causing the tool to pivot on bar 32. Figure 6 in full lines normally illustrates the completion of the cycle of operation with bar 32 still forming the pivot upon which the plurality of knives revolves. It has been found that there are some occasions when the clumps of grass and the like, particularly the noxious grasses, may grow in a solid hump, even above the soil level, and it is therefore very desirable that the bend indicated at 60 in handle 40 can then become a fulcrum after the showing, in dashed lines, in Figure 6 so that the knives can be fully passed through any such above-surface mass. It is also useful when working in uneven ground where fulcrum 32 might not permit passing the knives up to the surface.

Professional students in the care of lawns, such as park attendants and the like, have long recognized the difficulties of maintaining a lawn over a long period and have used a variety of means in order to achieve the loosening up of the subsoil without destroying the surface. This present device meets this need and to this end may be used in a variety of ways. Sometimes it is best used by making only a partial revolution about fulcrum 32, as, for instance, to the degree shown in Figure 5. This is the very least disturbing to the grass surface and for many uses has been found to be very satisfactory. Other manners of use will no doubt occur to persons working in this field of endeavor.

When, it is said in the claims, that in transverse cross-sections the tines are substantially elongated in parallel planes normal to the cross bar and are relatively thin laterally of the parallel planes, the tines are distinguished from the conventional fork tines. "Substantially elongated" means that the tines will have at least approximately double width to thickness and, conversely, the term "relatively thin laterally" means that the tines will have as thickness at most approximately half of the width. If the tines do not have at least this proportion of width to thickness, then either they will be too thick to readily pass through the ground or they will be not wide enough to insure resistance to deformation in use. The width and thickness of a hunting-knife blade is suitable and it has been found that the proportions of the blades shown in the drawings are quite satisfactory.

It is believed that it will be clearly apparent from the above description and the disclosure in the drawings that the invention comprehends a novel construction of a lawn conditioning fork.

Having thus disclosed the invention, I claim:

1. A lawn conditioninng fork, comprising: a cross bar and a series of parallel, spaced apart, elongated tines positioned side by side and extending from said cross bar which fixedly positions the same; a handle fixed to said cross bar and extending therefrom in a direction generally opposite to said tines, said handle having such length that the fork can be inserted in the ground in the manner of a spade; the tines having the general shape of knife-blades and in transverse cross-sections said tines being substantially elongated in parallel planes normal to said cross bar and being relatively thin laterally of the parallel planes and the tines each having an acutely sharpened longitudinal edge, all of the sharpened edges facing in the same direction and the tines having their ends opposite the cross bar tapered; the tines having a bend in said parallel planes which is aligned throughout the series and at a point a short distance from said cross bar relative the over-all length of the tines whereby the edges of the tines which are sharpened form obtuse angles; said handle having a bend in a plane parallel to said parallel planes at a point a short distance from said cross bar relative the over-all length of the handle, the bend forming an obtuse angle on the side surface of the handle corresponding to the sharpened edges of the tines.

2. A lawn conditioning fork, comprising: a cross bar and a plurality of parallel, spaced-apart, elongated tines positioned side by side and extending from said cross bar which fixedly positions the same; a handle fixed to said cross bar and extending therefrom in a direction generally opposite to said tines, said handle having such length that the fork can be inserted in the ground in the manner of a spade; in transverse cross-sections said tines being substantially elongated in parallel planes normal to said cross bar and being relatively thin laterally of the parallel planes and the tines each having an acutely sharpened longitudinal edge, all of the sharpened edges facing in the same direction and the tines having their ends opposite the cross bar tapered whereby the tines have knife-blade shapes; the tines having a bend in said parallel planes which is aligned therebetween and at a point a short distance from said cross bar relative the over-all length of the tines whereby the edges of the tines which are sharpened form obtuse angles.

3. A lawn conditioning fork, comprising: a cross bar and a series of parallel, spaced-apart, elongated tines positioned side by side and extending from said cross bar which fixedly positions the same; a handle fixed to said cross bar and extending therefrom in a direction generally opposite to said tines, said handle having such length that the fork can be inserted in the ground in the manner of a spade; said tines having the general shape of knife-blades and in transverse cross-sections said tines being substantially elongated in parallel planes normal to said cross bar and being relatively thin laterally of the parallel planes, the tines each having an acutely sharpened longitudinal edge, all of the sharpened edges facing in the same direction and the tines having their ends opposite the cross bar tapered, the tines having a bend in said parallel planes which is aligned throughout the series and at a point a short distance from said cross bar relative the over-all length of the tines whereby the edges of the tines which are sharpened form obtuse angles; said handle having a bend in a plane parallel to said parallel planes at a point a short distance from said cross bar relative the over-all length of the handle, the bend forming an obtuse angle on the side surface of the handle corresponding to the sharpened edges of the tines; said cross bar having the shape of an angle iron with one flange abutting and fixed to the adjacent ends of the tines and with the other flange abutting and fixed to the adjacent longitudinal edges of the tines opposite said sharpened edges.

4. A lawn conditioning device, consisting of: a backing member having a footrest portion and a fulcrum portion disposed at right angles to each other; a plurality of knife-like tines fixedly secured to said backing member; each of said tines secured to both the footrest portion and the fulcrum portion of said backing member; each tine having a handle-like base portion and an acutely sharpened cutting portion that is knife-like in construction, comprising a sharpened cutting edge and a supporting body of thin, rectangular cross-section; a handle tang fixedly secured to said backing member, generally in parallel relationship to said tines; a handle having a straight shaft portion terminating at its lower end with a curved tapered portion; a metal ferrule having an upper tapered bore adapted to receive the tapered portion of said handle, and a lower tapered portion accommodating said tang and the lower end of said handle which encircles said tang and a bend in said ferrule joining the upper and lower portions of said ferrule; and said handle and ferrule assembly disposed with the curve of the ferrule revolved 180° from the normal position of a fork handle.

References Cited in the file of this patent

UNITED STATES PATENTS

| | | |
|---|---|---|
| 654,645 | Keiller | July 31, 1900 |
| 1,577,927 | Morse | Mar. 23, 1926 |
| 1,755,651 | Kingsbury | Apr. 22, 1930 |

FOREIGN PATENTS

| | | |
|---|---|---|
| 110,573 | Austria | Sept. 10, 1928 |
| 459,918 | Great Britain | Jan. 15, 1937 |
| 71,135 | Norway | Oct. 14, 1946 |